United States Patent Office 3,634,421
Patented Jan. 11, 1972

3,634,421
2-(p-ALKOXYBENZYL) - 5-CHLORO-3,2-(TERTIARY AMINO)-ETHYL - 2,3 - DIHYDRO - 3 - BENZO-FURANOLS
Knut A. Jaeggi, Basel, and Ulrich Renner, Riehen, near Basel, Switzerland, assignors to Geigy Chemical Corporation, Ardsley, N.J.
No Drawing. Filed Sept. 2, 1969, Ser. No. 854,745
Claims priority, application Switzerland, July 16, 1969, 10,832/69
Int. Cl. C07d 87/32
U.S. Cl. 260—247.7 C
6 Claims

ABSTRACT OF THE DISCLOSURE

The compounds are of the class of N-substituted 2-(p-alkoxybenzyl) - 5 - chloro-3-(2-aminoethyl)-2,3-dihydro-3-benzofuranols and the pharmaceutically acceptable acid addition salts thereof and have analgesic, antitussive and musculotrop-spasmolytic activities; they are, together with pharmaceutical carrier substances, active ingredients of pharmaceutical compositions; methods of alleviating pain in a mammal and of treating spastic conditions in a mammal are provided; an illustrative embodiment is 2 - (p-ethoxybenzyl) - 5 - chloro-3-[2-(diethylamino)-ethyl]-2,3-dihydro-3-benzofuranol.

DETAILED DISCLOSURE

The present invention relates to substituted benzofuranol derivatives and the pharmaceutically acceptable acid addition salts thereof with analgesic, antitussive and musculotrop-spasmolytic properties, to pharmaceutical compositions containing these compounds and a pharmaceutical carrier, as well as to their use.

More particularly the present invention relates to compound of the formula

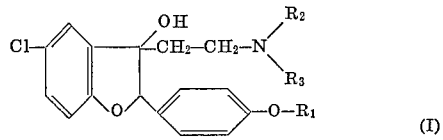

(I)

wherein $R_1$ is alkyl having at most 4 carbon atoms, and
each of $R_2$ and $R_3$ independent of the other is alkyl having at most 3 carbon atoms or form, together with the adjacent nitrogen, the 1-pyrrolidinyl, piperidino or morpholino group, and the pharmaceutically acceptable acid addition salts thereof.

A preferred subclass are compounds of Formula I, wherein $R_1$ is ethyl, each of $R_2$ and $R_3$ is ethyl or $R_2$ and $R_3$ form, together with the adjacent nitrogen, the 1-pyrrolidinyl, piperidino or morpholino group; and the pharmaceutically acceptable acid addition salts thereof.

Typical members are the following compounds of Formula I:

2-(p-ethoxybenzyl)-5-chloro-3-[2-(diethylamino)-ethyl]-2,3-dihydro-3-benzofuranol,
2-(p-ethoxybenzyl)-5-chloro-2,3-dihydro-3-[2-(1-pyrrolidinyl)-ethyl]-3-benzofuranol,
2-(p-ethoxybenzyl)-5-chloro-2,3-dihydro-3-(2-piperidinoehyl)-3-benzofuranol,
2-(p-ethoxybenzyl)-5-chloro-2,3-dihydro-3-(2-morpholinoethyl)-3-benzofuranol, and the pharmaceutically acceptable acid addition salts, especially the hydrochlorides thereof.

The present invention relates also to pharmaceutical compositions comprising an effective amount of a compound of Formula I or a pharmaceutically acceptable acid addition salt thereof and a pharmaceutical carrier thereof.

The present invention further relates to the methods of alleviating pain and of treating spastic conditions in a mammal comprising administering an effective amount of a compound of Formula I or a pharmaceutically acceptable acid addition salt thereof.

In the compounds of Formula I and the appertaining starting materials and intermediates given below, $R_1$ as alkyl having at most 4 carbon atoms is for example the methyl, ethyl, n-propyl, isopropyl, n-butyl, isobutyl and sec. butyl group. $R_2$ and $R_3$ as alkyl having at most 3 carbon atoms are, for example, the methyl, ethyl or n-propyl group. $R_2$ can also be the isopropyl group.

The benzofuran derivatives of Formula I and their acid addition salts are produced by reacting a reactive ester, with respect to the primary hydroxyl group, of a compound of Formula II

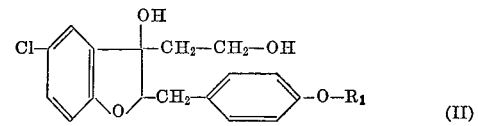

(II)

wherein $R_1$ hast he meaning given under Formula I, with a compound of the Formula III

(III)

wherein $R_2$ and $R_3$ have the meaning given under Formula I and, optionally, converting the obtained benzofuran derivative of the Formula I into an addition salt with an inorganic or organic acid.

Suitable as reactive esters of compounds of the Formula II are, e.g. sulphonic acid esters and the methane sulphonic acid esters, as well as hydrohalic acid esters such as, e.g. iodides, bromides and chlorides. As reaction medium and simultaneously as acid-binding agent, an excess of the base to be reacted of the Formula III can be used, whereby the reaction is preferably performed between 60° and 120°, i.e. at the boiling temperature of the base or, optionally, below this temperature or above and, in the latter case, in a closed vessel. Using dimethylformamide as reaction medium and an excess of base as acid-binding agent, the reaction can be performed at room temperature to moderately elevated temperature. Furthermore, the reaction can be carried out, e.g. in ethanol, butanone or dioxane, preferably at their boiling point, whereby excess base of Formula III can be used as acid-binding agent or, e.g. also tertiary organic bases or inorganic acid-binding substances, e.g. carbonates such as potassium carbonate.

The benzofuran derivatives of the Formula II are, for their part, new substances. They are produced, e.g. starting with 5-chloro-3(2H)-benzofuranone. This is firstly condensed with lower p-alkoxybenzaldehydes and the obtained 2-(p-alkoxybenzylidene)-derivatives are hydrogenated to give the corresponding 2-(p-alkoxybenzyl)-3 (2H)-benzofuranones of the general Formula IV,

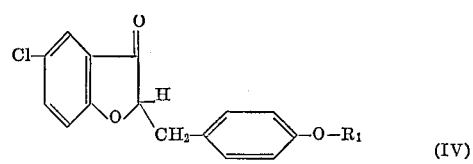

(IV)

wherein $R_1$ has the meaning given under Formula I. By reacting the compounds of the Formula IV with lower 2-bromoacetic acid alkyl esters and zinc in benzene, lower 2-(p-alkoxybenzyl) - 3 - hydroxy-2,3-dihydro-5-chloro-3- benzofuranacetic acid alkyl esters are obtained corresponding to the Formula V,

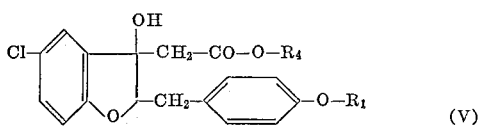

wherein
$R_4$ is a lower alkyl group and
$R_1$ has the meaning given under Formula I.

The reduction of the esters of the Formula V with complex hydrides such as, e.g. lithium aluminium hydride or diborane in ethereal solvents, yields the 2-(p-alkoxybenzyl) - 5 - chloro - 2,3 - dihydro-3-hydroxy-3-benzofuranethanols of the Formula II. These are converted, e.g. at low temperatures with sulphonic acid chlorides, e.g. p-toluenesulphonyl chloride or methanesulphonyl chloride, in the presence of pyridine into the corresponding sulphonic acid esters. By reaction of the latter with metal halides, e.g. with sodium or potassium iodide in acetone at boiling temperature or in dimethylformamide at room temperature to moderately elevated temperature, corresponding hydrohalic acid esters are obtained, especially iodides.

Crystallised esters of the Formula V can be obtained in good yield from the crude Reformatsky products, but the crude products can also be reduced directly to the corresponding alcohols of the Formula II and just the latter purified by crystallisation. Moreover, reactive esters of alcohols of the Formula II, e.g. p-toluenesulphonic acid esters, can generally be well crystallised in spite of their relatively low melting point. From starting materials produced in this manner are obtained the end materials of the Formula I in moderate to high yield. Their acid addition salts, e.g. the hydrochlorides, are characterised in that they crystallise well.

Optionally, the benzofuran derivatives of the Formula I obtained using the process according to the invention, are subsequently converted in the usual manner into their addition salts with inorganic and organic acids. For example, the acid desired as salt component, or a solution thereof, is added to a solution of a compound of the Formula I in an organic solvent such as acetone, dioxane, methanol or ethanol, or diethyl ether, and the salt separated which precipitates directly or after addition of a second organic liquid such as, e.g. diethyl ether to acetone, or water to water-miscible solvents, such as acetone or dioxane.

Optionally, for use as active substances for medicaments, it is possible to use instead of free bases, and preferably in solutions, pharmaceutically acceptable acid addition salts, i.e. salts with such acids, the anions of which, in the case of the dosages in question, have either no inherent pharmacological action or a desired one. Furthermore, it is of advantage if the salts to be used as active substances crystallise well and are not, or only slightly, hygroscopic. For salt formation with compounds of the Formula I it is possible to use, e.g. hydrochloric acid, hydrobromic acid, sulphuric acid, phosphoric acid, methanesulphonic acid, ethanesulphonic acid, β-hydroxyethanesulphonic acid, acetic acid, malic acid, tartaric acid, citric acid, lactic acid, succinic acid, fumaric acid, maleic acid, ascorbic acid, benzoic acid, salicylic acid, phenylacetic acid, mandelic acid, embonic acid or 1,5-naphthalene disulphonic acid.

The useful pharmacological properties of the compounds of Formula I are demonstrated in a number of well known pharmacological tests.

The analgesic activity is demonstrated in the Hot-Plate-Test according to A. D. Woolfe and G. McDonald, J. Pharmacol. Exptl. Therap. 80, 300 (1944), using mice as experimental animals. In this test, for example, the 2-(p-ethoxybenzyl) - 5 - chloro - 3 - [2-(diethylamino)-ethyl]-2,3-dihydro-3-benzofuranol hydrochloride shows a significant prolongation of the reaction time, i.e. an analgesic effect, on administration of about 200 mg./kg. orally or about 25 mg./kg. intraperitoneally.

The analgesic activity is further demonstrated in the Tail-Flick-Test according to C. Reichle, Arch. Exp. Path. and Pharmakol. 226, 551 (1955), using mice as experimental animals. In this test, for example, the 2-(p-ethoxybenzyl) - 5 - chloro-3-[2-(diethylamino)-ethyl]-2,3-dihydro-3-benzofuranol hydrochloride shows a significant prolongation of reaction time, i.e. an analgesic effect, on administration of about 50 mg./kg. orally or about 10 mg./kg. intraperitoneally.

Similar analgesic activity show that other typical members of the compounds of Formula I.

The musculotropic-spasmolytic activity of compounds of Formula I and their pharmaceutically acceptable salts is demonstrated with a test wellknown in the art, namely with the isolated intestine of the guinea pig, whereby the papaverine value is determined. The latter is a measure for the amount of test compound having an equally lytic effect as papaverine in counteracting the spasms produced by barium chloride. Thus, it is shown that the compounds of Formula I and the pharmaceutically acceptable acid addition salts thereof have a significant spasmolytic activity.

The pharmacologically active compounds have a favourable low toxicity and exhibt no depressant effect on the central nervous system. Their good compatibility in addition to above described activities render them suitable as active ingredients of pharmaceutical compositions for oral, rectal or parenteral administration for the relief and removal of conditions of pain of varying origin, including those of spasmodic nature.

For their intended use, the new benzofuran derivatives of Formula I and their pharmaceutically acceptable acid addition salts are administered orally, rectally and parenterally in amounts depending on the species and the age, weight and the particular condition of the individual being treated. For the treatment of conditions of pain in the case of mammals, daily dosages of 0.1–10.0 mg. per kg. of body-weight are administered parenterally, preferably, 0.1–10 mg./kg., and daily dosages of 5–100 mg./kg. are administered orally or rectally, preferably 5–20 mg./kg. Dosage units suitable for oral or rectal administration, such as dragées, capsules, tablets or suppositories, preferably contain 5–100 mg., and amopules preferably contain 5–25 mg. of a benzofuran derivative of the general Formula I or of a pharmaceutically acceptable salt thereof.

Dosage units for oral administration preferably contain as active substance between 5% and 90% of a pharmaceutically acceptable salt thereof. They are produced by combining the active substance, e.g. with solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants, such as magnesium or calcium stearate or polyethylene glycols, to form tablets or dragée cores. The latter are coated, e.g. with concentrated sugar solutions which can also contain, e.g. gum arabic, talcum and/or titanium dioxide, or with a lacquer dissolved in readily volatile organic solvents or mixtures of solvents. Dyestuffs can be added to these coatings, e.g. to distinguish between varying dosages of active substance. Also suitable as oral dosage units are hard gelatine capsules as well as soft closed capsules made from gelatine and a softener, such as glycerin. The former preferably contain the active substance as a granulate in admixture with lubricants such as talcum or magnesium stearate and, optionally, stabilisers such as sodium metabisulphite or ascorbic acid. In soft capsules, the active substance is preferably dissolved or suspended in suitable liquids, such as liquid polyethylene glycols, whereby stabilisers can likewise be added.

Suitable dosage units for rectal administration are, e.g. suppositories consisting of a combination of a benzofuran derivative of the Formula I, or of a suitable salt thereof, with a neutral fatty base and, in addition, gelatine rectal capsules containing a combination of the active substance with polyethylene glycols.

Ampoules for parenteral, especially intramuscular and also intravenous administration, preferably contain a water-soluble salt of a benzofuran derivative of the Formula I as active substance in a concentration of preferably 0.5–5%, optionally together with suitable stabilisers and buffer substances in aqueous suspension.

The following examples will serve to further typify the nature of the present invention they should, however, not be construed as a limitation on the scope thereof.

Example 1

(a) 45 g. (0.267 mol) of 5 - chloro - 3(2H) - benzofuranone [cp. K. Fries, A. Hasselbach and L. Schröter, Justus Liebigs Ann. Chem. 405, 346 (1914)] are dissolved in 35 ml. of hot absolute ethanol. To this solution are added 40.5 g. (0.290 mol) of p-ethoxybenzaldehyde and 2 ml. of concentrated hydrochloric acid and it is then refluxed for half an hour. The acid addition produces a deep red colouration of the solution and an exothermic reaction. After a short time, the benzylidene compound commences to precipitate. After cooling, the reaction mixture is allowed to stand for ca. 15 hours at 0° and then the reaction product is filtered with suction and washed with a little ethanol. 65.9 g. (82% of theoretical value) of 2 - (p - ethoxybenzylidene)-5-chloro-3(2H)-benzofuranone are obtained as yellow needles, M.P. after recrystallisation from ethanol 174–175°.

(b) 42.0 g. (0.14 mol) of 2-(p-ethoxybenzylidene)-5-chloro-3(2H)-benzofuranone in 800 ml. of dioxane are added to 7 g. of pre-hydrogenated catalyst (5% palladium on barium carbonate) and hydrogenated at room temperature under normal pressure. After ca. 22 hours, the hydrogen absorption is ca. 100% of the theoretical value and ceases. The catalyst is then separated off by filtration and the filtrate concentrated by evaporation in vacuo. After crystallisation of the residue from ether, 27 g. of 2 - (p - ethoxybenzyl) - 5-chloro-3(2H)-benzofuranone are obtained as yellowish crystals, M.P. 77–78°, yield 64% of theoretical value.

(c) 26.0 g. (0.086 mol) of 2-(p-ethoxybenzyl)-5-chloro-3(2H)-benzofuranone and 67.0 g. (0.4 mol) of bromoacetic acid ethyl ester are together dissolved in 430 ml. of absolute benzene and slowly added dropwise to a mixture of 31.5 g. of zinc wool, 0.1 g. of mercury (II)-chloride and 150 ml. of boiling benzene, which is vigorously stirred. Practically the whole of the zinc is dissolved after 3 hours. The reaction mixture is then refluxed for a further 4 hours at boiling temperature. It is then cooled to 0° and stirred for half an hour with 300 ml. of 2 N sulphuric acid. The benzene layer is then removed, washed until neutral, dried over sodium sulphate and filtered through a chromatography column charged with 500 g. of neutral aluminium oxide, Woelm activity stage III. Eluting with benzene and combined concentration by evaporation of filtrate and extract yield 19.7 g. of oily 2-(ethoxybenzyl) - 3 - hydroxy - 5 - chloro-2,3-dihydro-3-benzofuranacetic acid ethyl ester (61% of theoretical value). From ether/petroleum ether is obtained the ester as colourless crystals, M.P. 83.5–84° in a yield of ca. 54% theoretical value.

(d) 19.5 g. (ca. 0.05 mol) of the oily 2-(p-ethoxybenzyl) - 3 - hydroxy-5-chloro-2,3-dihydro-3-benzofuranacetic acid ethyl ester of (c) are dissolved in 100 ml. of tetrahydrofuran and, while stirring, added dropwise to a suspension of 8.9 g. of lithium aluminium hydride in 100 ml. of tetrahydrofuran and refluxed for 3 hours. The mixture is then cooled to −5° and decomposed by adding ethyl acetate dropwise. It is then adjusted to pH 3–4 with 2 N hydrochloric acid and concentrated in vacuo at 30°. To the concentrate is added a solution of 20 g. of potassium sodium tartrate (Seignette' salt) and the pH-value adjusted to 8 with concentrated ammonia. The mixture is extracted with ether, the ether solution washed and dired over sodium sulphate and then concentrated by evaporation to obtain 18.0 g. of oily crude product. The latter is passed through a chromatography column charged with 600 g. of neutral aluminium oxide, Woelm activity stage III, and eluted with benzene. The evaporation residue of the extract is crystallised from ether/petroleum ether, whereby 12.2 g. (70% of the theoretical value) of 2-(p-ethoxybenzyl) - 3-hydroxy-5-chloro-2,3-dihydro-3-benzofuranethanol are obtained as colourless crystals, M.P. 96–98°.

(e) 12.2 g. (0.035 mol) of the alcohol obtained according to (d), are dissolved in 115 ml. of absolute pyridine and the solution is cooled to −10°. 22.8 g. (0.12 mol) of p-toluenesulphochloride are added in portions in such a manner that the temperature does not exceed −5°. The mixture is allowed to stand for ca. 15 hours at 0° and is then poured into ice water. The precipitated oil is taken up in chloroform and the solution separated from adhering pyridine by shaking with 0.5 N hydrochloric acid. The chloroform solution is then washed neutral, dried over sodium sulphate and concentrated by evaporation. Upon crystallisation of the residue from ether/petroleum ether are obtained 9.0 g. of p-toluenesulphonic acid - 2-[2 - (p - ethoxybenzyl) - 3-hydroxy-5-chloro-2,3-dihydro-3-benzofuranyl]-ethyl ester as colourless crystals, M.P. 112–113°, yield 54% of theoretical value.

(f) 2.5 g. (0.0050 mol) of the p-toluenesulphonic acid ester of (e) are refluxed with 30 ml. (ca. 0.34 mol) of morpholine in a reflux condenser for 5 hours with a bath temperature of 110°. The reaction mixture is then completely concentrated by evaporation in vacuo, 20 ml. of benzene are added to the residue and the mixture is again concentrated by evaporation. This is repeated until all the volatile amine has been expelled. The residue is taken up with water and ether. The ethereal phase is washed with water and then extracted twice using 5 ml. of 1 N sulphuric acid each time. The acid extracts are adjusted to pH 9 with concentrated ammonia and the thereby oily precipitating base is extracted with ether. The ether solution, after being washed and dried over sodium sulphate, is concentrated by evaporation. The crude base remaining is dissolved in acetone and to the solution is added a small excess of ethereal hydrogen chloride solution. The precipitated hydrochloride crystallises upon trituration. After recrystallisation from acetone, 1.73 g. (79% of theoretical value) of 2-(p-ethoxybenzyl)-5 - chloro - 2,3-dihydro-3-(2-morpholinoethyl)-3-benzofuranol hydrochloride, M.P. 194–196°, are obtained.

Example 2

3.0 g. (0.0060 mol) of p-toluenesulphonic acid-2-[2-(p-ethoxybenzyl) - 3 - hydroxy - 5 - chloro-2,3-dihydro-3-benzofuranyl]-ethyl ester [cp. Example 1 (a) to (e)] are refluxed with 20 ml. (ca. 0.44 mol) of pyrrolidine for 4 hours. The reaction solution is then completely concentrated by evaporation in vacuo, 30 ml. of benzene are added and the reaction mixture again completely concentrated by evaporation. The residue is taken up in water and ether. The ethereal phase is repeatedly washed with water and then extracted three times using 10 ml. of 1 N hydrochloric acid each time. The acid extracts are adjusted to pH 9 with concentrated ammonia and the thereby oily precipitated base is extracted with ether. The ethereal extract, after being washed with water, is dried over sodium sulphate and concentrated by evaporation in vacuo. The obtained crude 2-(p-ethoxybenzyl)-5-chloro-2,3-dihydro-3-[2 - (1 - pyrrolidinyl)-ethyl] - 3-benzofuranol is dissolved in ether and a small excess of ethereal hydrochloric acid is added. The precipitated hydrochloride crystallises upon being triturated. After recrystallisation from acetone/ether are obtained 2.0 g. (80% of theoretical value) of colourless crystals of the 2 - (p-ethoxybenzyl) - 5 - chloro - 2,3-dihydro-3-[2-(1-pyrrolidinyl)-ethyl] - 3 - benzofuranol hydrochloride, M.P. 196–197° (with decomposition).

Example 3

(a) 2.5 g. (0.0050 mol) of p-toluenesulphonic acid-2-[2 - (p-ethoxybenzyl) - 3 - hydroxy - 5 - chloro-2,3-dihydro - 3 - benzofuranyl]-ethyl ester [cp. Example 1(a) to (e)] are refluxed with 30 ml. (ca. 0.30 mol) of piperidine for 5 hours. Preparation and production of the hydrochloride are carried out analogously to Example 1 (f). By this means are obtained 1.6 g. (74% of theoretical value) of 2-(p-ethoxybenzyl)-5-chloro-2,3-dihydro-3-(2-piperidinoethyl) - 3 - benzofuranol hydrochloride, M.P. 206–207° (from acetone/water).

Example 4

3.3 g. (0.0066 mol) of p-toluenesulphonic acid - 2-[2 - (p-ethoxybenzyl) - 3 - hydroxy - 5 - chloro-2,3-dihydro - 3 - benzofuranyl]-ethyl ester [cp. Example 1 (a) to (e)] are refluxed with 10 ml. (ca. 0.10 mol) of diethylamine for 48 hours. The reaction solution is then completely concentrated by evaporation in vacuo, 20 ml. of benzene are added and the reaction mixture again completely concentrated by evaporation. The residue is taken up in water and ether. The ethereal phase is repeatedly washed with water and then extracted three times using 5 ml. of 1 N hydrochloric acid each time. The acid extracts are adjusted to pH 9 with concentrated ammonia and the thereby oily precipitated base is extracted with ether. The ethereal extract, after being washed with water, is dried over sodium sulphate and concentrated by evaporation in vacuo. The obtained crude 2-(p-ethoxybenzyl)-5-chloro - 3 - [2 - (diethylamino)-ethyl] - 2,3 - dihydro-3-benzofuranol is dissolved in ether and a small excess of ethereal hydrochloric acid is added. The precipitated hydrochloride is recrystallised from acetone/ether, whereby 2.7 g. (96% of theoretical value) of 2-(p-ethoxybenzyl( - 5 - chloro - 3 - [2-(diethylamino)-ethyl] - 2,3-dihydro-3-benzofuranol hydrochloride are obtained as colourless crystals, M.P. 172–173°.

The following prescriptions further illustrate the production of preparations according to the invention:

Example 5

10 g. of 2 - (p-ethoxybenzyl) - 5 - chloro-3-[2-(diethylamino)-ethyl]-2,3 - dihydro - 3 - benzofuranol hydrochloride, 30 g. of lactose and 5 g. of highly-dispersed silicic acid are mixed together. The mixture is moistened with a solution of 5 g. of gelatine and 7.5 g. of glycerin in distilled water, and is then granulated through a sieve. The granulate is dried, sieved and carefully mixed with 3.5 g. of potato starch, 3.5 g. of talcum and 0.5 g. of magnesium stearate. The mixture is pressed into 1000 tablets each weighing 65 mg. and each containing 10 mg. of active substance.

Example 6

500 g. of 2 - (p-ethoxybenzyl) - 5 - chloro-2,3-dihydro-3 - [2 - (1 - pyrrolidinyl) - ethyl] - 3 - benzofuranol hydrochloride are mixed with 550 g. of lactose and 292 g. of potato starch. The mixture is moistened with an alcoholic solution of 8 g. of gelatine and granulated through a sieve. After drying, 60 g. of potato starch, 60 g. of talcum, 10 g. of magnesium stearate and 20 g. of highly dispersed silicon dioxide are mixed in. The mixture is then pressed into 10,000 tablets each weighing 150 mg. and each containing 50 mg. of active substance, whereby the tablets can optionally be provided with grooves for more accurate adjustment of the dosage amount.

Example 7

10 g. of 2-(p-ethoxybenzyl)-5-chloro-3-[2-(diethylamino)-ethyl]-2,3-dihydro - 3 - benzofuranol hydrochloride, 15 g. of lactose and 20 g. of starch are mixed together. The mixture is moistened with a solution of 5 g. of gelatine and 7.5 g. of glycerin in distilled water and granulated through a sieve. The granulate is dried, sieved and carefully mixed with 3.5 g. of talcum and 0.5 g. of magnesium stearate. The mixture is pressed into 1000 dragée cores. These are subsequently coated with a concentrated syrup made from 26.66 g. of crystallised saccharose, 17.5 g. of talcum, 1 g. of shellac, 3.75 g. of gum arabic, 1 g. of highly dispersed silicic acid and 0.090 g. of dyestuff, and dried. The obtained dragées each weigh 115 mg. and each contain 10 mg. of active substance.

Example 8

A granulate is produced from 250 g. of 2-(p-ethoxybenzyl)-5-chloro - 2,3 - dihydro - 3-[2-(1-pyrrolidinyl)-ethyl]-3-benzofuranol hydrochloride, 175.90 g. of lactose and the alcoholic solution of 10 g. of stearic acid. After drying, the granulate is mixed with 56.60 g. of highly dispersed silicon dioxide, 165 g. of talcum, 20 g. of potato starch and 2.50 g. of magnesium stearate and the obtained mixture is pressed into 10,000 dragées cores. These are subseqeuntly coated with a concentrated syrup made from 502.28 g. of crystallised saccharose, 6 g. of shellac, 10 g. of gum arabic, 0.22 g. of dyestuffs and 1.5 g. of titanium dioxide, and dried. The obtained dragées each weigh 120 mg. and each contain 25 mg. of active substance.

Example 9

To produce 1000 capsules each containing 25 mg. of active substance, 25 g. of 2-(p-ethoxybenzyl) - 5 - chloro-3-[2-(diethylamino)-ethyl] - 2,3 - dihydro-3-benzofuranol hydrochloride are mixed with 248 g. of lactose. The mixture is evenly moistened with an aqueous solution of 2 g. of gelatin and granulated through a suitable sieve (e.g. sieve III according to Ph. Helv. V). The granulate is mixed together with 10 g. of dried maize starch and 15 g. of talcum and the mixture is uniformly filled into 1000 hard gelatine capsules, size 1.

Example 10

A suppository mixture is prepared from 5 g. of 2-(p-ethoxybenzyl) - 5 - chloro-3-[2-(diethylamino)-ethyl]-2,3-dihydro-3-benzofuranol hydrochloride and 163.5 g. of adeps solidus and from the mixture are poured 100 suppositories each containing 50 mg. of active substance. It is possible to use as active substance the same amount of 2-(p-ethoxybenzyl) - 5 - chloro - 2,3 - dihydro-3-[2-(1-pyrrolidinyl)-ethyl] - 3 - benzofuranol hydrochloride.

Example 11

1 g. of 2-(p-ethoxybenzyl) - 5 - chloro-3-[2-(diethylamino)-ethyl] - 2,3 - dihydro - 3 - benzofuranol hydrochloride and 0.10 g. of ascorbic acid are dissolved in distilled water and diluted to 100 ml. The obtained solution is used to fill ampoules, each having a content, e.g. of 1 ml., corresponding to a content of 10 mg. of active substance. The filled ampoules are sterilised by heating in the usual manner.

Example 12

1 g. of 2-(p-ethoxybenzyl) - 5 - chloro-2,3-dihydro-3-[2-(1-pyrrolidinyl)-ethyl]-3 - benzofuranol hydrochloride and 4.4 g. of glycerin are dissolved in distilled water to give 200 ml. and the solution is filled into 100 ampoules each of 2 ml. and each containing 10 mg. of active substance.

We claim:
1. A compound of the formula

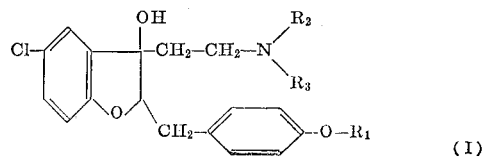

(1)

wherein:

$R_1$ is alkyl having at most 4 carbon atoms, and each of $R_2$ and $R_3$ independent of the other is alkyl having at most 3 carbon atoms or form, together with the adjacent nitrogen, the 1-pyrrolidinyl, piperidino or morpholino group, or a pharmaceutically acceptable acid addition salt thereof.

2. A compound as defined in claim 1 wherein $R_1$ is ethyl, each of $R_2$ and $R_3$ is ethyl or $R_2$ and $R_3$ form, together with the adjacent nitrogen, the 1-pyrrolidinyl, piperidino or morpholino group, or a pharmaceutically acceptable acid addition salt thereof.

3. A compound as defined in claim 1 which is 2-(p-ethoxybenzyl)-5-chloro-3-[2 - (diethylamino) - ethyl]-2,3-dihydro-3-benzofuranol.

4. A compound as defined in claim 1 which is 2-(p-ethoxybenzyl) - 5 - chloro - 2,3 - dihydro-3-[2-(1-pyrrolidinyl)-ethyl]3-benzofuranol.

5. A compound as defined in claim 1 which is 2-(p-ethoxybenzyl) - 5 - chloro - 2,3 - dihydro-3-(2-piperidino-ethyl)-3-benzofuranol.

6. A compound according to claim 1 which is 2-(p-ethoxybenzyl) - 5 - chloro - 2,3 - dihydro-3-(2-morpholino-ethyl)-3-benzofuranol.

No references cited.

ALEX MAZEL, Primary Examiner

J. TOVAR, Assistant Examiner

U.S. Cl. X.R.

260—247.1, 247.2 R, 293.4 A, 294 .5, 294.7 D, 326.3, 326.5 D, 346.2 R; 424—248